US005767389A

United States Patent [19]

LaFountain

[11] Patent Number: 5,767,389

[45] Date of Patent: Jun. 16, 1998

[54] METHOD AND APPARATUS FOR TESTING A FLUID PRESSURE APPARATUS

[75] Inventor: Robert Henry LaFountain, Rochester, Mich.

[73] Assignee: Automotive Products (USA), Inc., Auburn Hills, Mich.

[21] Appl. No.: 507,108

[22] Filed: Jul. 26, 1995

[51] Int. Cl.[6] .......... G01M 3/02

[52] U.S. Cl. .......... 73/39; 73/49.7; 73/168

[58] Field of Search .......... 73/1.57, 1.58, 73/1.59, 1.63, 1.66, 1.67, 39, 40, 49.7, 121, 168

[56] References Cited

U.S. PATENT DOCUMENTS

| | | | |
|---|---|---|---|
| 4,959,960 | 10/1990 | LaFountain | 60/533 |
| 4,993,259 | 2/1991 | LaFountain | 73/168 |

OTHER PUBLICATIONS

Article in "Automotive Engineering", entitled Testing Method Modernized, Jun. 1992, pp. 37–38 by SAE International.

"Signature Analysis" (5 pgs.) advertising brochure.

"Engine Test Systems" single–page advertisement by Proel Systems USA.

*Primary Examiner*—George M. Dombroske

*Assistant Examiner*—Eric S. McCall

*Attorney, Agent, or Firm*—Young & Basile, P.C.

[57] ABSTRACT

A method and apparatus for testing and filling hydraulic assemblies such as a hydraulic clutch control assembly for a motor vehicle. A conduit is placed in communication with a pressure chamber of the assembly; air is sucked out of the pressure chamber through the conduit while a series of pressure readings are taken in the conduit indicative of the gradually declining pressure within the pressure chamber; the pressure readings are utilized to generate a vacuum signature; the vacuum signature is compared to a stored vacuum signature corresponding to an acceptable hydraulic assembly; the hydraulic assembly is accepted or rejected based on the match between the generated vacuum signature and the stored vacuum signature; assuming that the assembly is accepted, liquid is supplied through the conduit to gradually fill the pressure chamber of the assembly while taking a series of pressure readings indicative of the pressure in the chamber during the fill process; the fill pressure readings are utilized to generate a fill signature; the fill signature is compared to a stored fill signature corresponding to an acceptable assembly; and the assembly is rejected or accepted based on the correspondence between the generated fill signature and the stored fill signature.

29 Claims, 3 Drawing Sheets

METHOD AND APPARATUS FOR TESTING A FLUID PRESSURE APPARATUS

BACKGROUND OF THE INVENTION

The present invention relates to hydraulic apparatus in general and more particularly to a hydraulic control apparatus comprising a hydraulic master cylinder and a hydraulic slave cylinder for operating a mechanism remotely located from the master cylinder, the hydraulic control apparatus being prefilled with hydraulic fluid and pretested prior to shipment to a motor vehicle manufacturer for installation in a motor vehicle.

It is known to prefill with hydraulic fluid a motor vehicle clutch control apparatus comprising a master cylinder, a reservoir of hydraulic fluid and a slave cylinder for operating the throw out bearing of a mechanical diaphragm spring clutch. Such prefilled hydraulic control apparatus are shown, for example, in U.S. Pat. Nos. 4,407,125, 4,599,860, 4,503,678, 4,506,507, 4,959,960, and 4,993,259, all assigned to the assignee of the present invention.

As is well known, prefilling with hydraulic fluid and pretesting hydraulic apparatus for operating motor vehicle mechanisms such as mechanical clutches presents the many advantages, for the motor vehicle manufacturer, of receiving a fully assembled mechanism comprising all of the components filled with hydraulic fluid and pretested for proper operation ready to install on a motor vehicle on the assembly line without requiring that the components be installed, separately connected by way of a flexible conduit, and filled after installation with hydraulic fluid while being purged of any atmospheric air contained in the apparatus.

Fast, efficient and accurate prefilling and testing of the hydraulic apparatus is critical to the commercialization of such prefilled controlled apparatus. Various filling and testing methods are disclosed in the above-identified patents assigned to applicant's assignee.

Specifically, in U.S. Pat. No. 4,407,125, liquid is supplied through the open top of the reservoir until the liquid bleeds out of a bleed port in the slave cylinder whereupon the filling is terminated.

In U.S. Pat. Nos. 4,506,507 and 4,503,678, a port is provided in a side wall of the reservoir, vacuum is applied to the system through the port to evacuate the system, liquid is introduced into the system through the port, and the port is thereafter sealed with a plug which serves to allow flow of hydraulic fluid out of the reservoir upon excess pressure but prevents reverse flow.

In U.S. Pat. No. 4,959,960, the apparatus is filled by the use of a filling head which is fitted into the open top of the reservoir and which includes a nozzle portion having an exterior surface enclosing a volume which approximates the volume of the diaphragm so that, following filling of the apparatus, removal of the filling head, and reinsertion of the diaphragm, the apparatus is automatically placed in the totally filled condition. In U.S. Pat. No. 4,993,259, the system is closed to substantially preclude escape of hydraulic fluid from the cylinder bore through the conduit means, a predetermined force is applied to the piston to urge the piston to move in the cylinder bore, and the magnitude of the movement of the piston in the cylinder bore in response to the predetermined force is measured to determine the acceptability or unacceptability of the unit under test.

Whereas the filling and testing methods disclosed in these patents have proven to be generally satisfactory, there continues to be a need to improve the apparatus and methodology of filling and testing to provide more reliable, less expensive, and faster filling and testing.

SUMMARY OF THE INVENTION

This invention is directed to the provision of improved method and apparatus for testing the integrity of a fluid pressure apparatus.

More specifically, this invention is directed to the provision of improved method and apparatus for filling, and testing the integrity of, a fluid pressure apparatus.

Yet more specifically, this invention is directed to the provision of an improved method and apparatus for prefilling a hydraulic control apparatus.

The invention methodology relates to the testing and filling of a fluid pressure apparatus having a fluid pressure chamber. For example, the fluid pressure apparatus may comprise a hydraulic control apparatus including a slave cylinder; a conduit connected to one end of the inlet port and the slave cylinder; a master cylinder connected at its discharge port to the other end of the conduit; and a reservoir assembly associated with the master cylinder.

According to the invention, the mass of the fluid in the chamber of the fluid pressure apparatus is gradually varied; the pressure in the chamber is noted at successive times as the mass is varied, whereby to generate successive pressure reading; a signature is created from the pressure reading; and the signature is compared to a known stored signature of a satisfactory apparatus. This methodology provides a convenient means of readily determining the integrity of the apparatus under test.

According to one aspect of the invention methodology, the step of gradually varying the mass of fluid in the chamber comprises evacuating air from the chamber to gradually reduce the pressure in the chamber. This evacuation step, which precedes the filling step, is thus utilized to test the integrity of the apparatus.

According to another aspect of the invention methodology, the step of gradually varying the mass of fluid in the chamber comprises gradually filling the chamber with a fluid. According to this aspect of the invention methodology, the filling step, following the evacuating step, is utilized to provide a further determination with respect to the integrity of the apparatus.

According to a more specific aspect of the invention methodology, the step of gradually varying the mass of fluid in the chamber comprises evacuating air from the chamber to gradually reduce the pressure in the chamber, and thereafter filling the chamber with a fluid; the step of noting the pressure in the chamber at successive times comprises noting the pressure in the chamber at successive times as the chamber is evacuated and thereafter noting the pressure in the chamber at successive times as the chamber is filled; the step of creating a signature from the pressure readings comprises creating a vacuum signature as the chamber is evacuated and creating a fill signature as the chamber is thereafter filled; and the step of comparing the signature to a known storage signature comprises comparing the vacuum signature to a known stored vacuum signature and thereafter comparing the fill signature to a second known stored fill signature.

DETAILED DESCRIPTION OF THE PREFERRED EMBODIMENT

Figure 1:
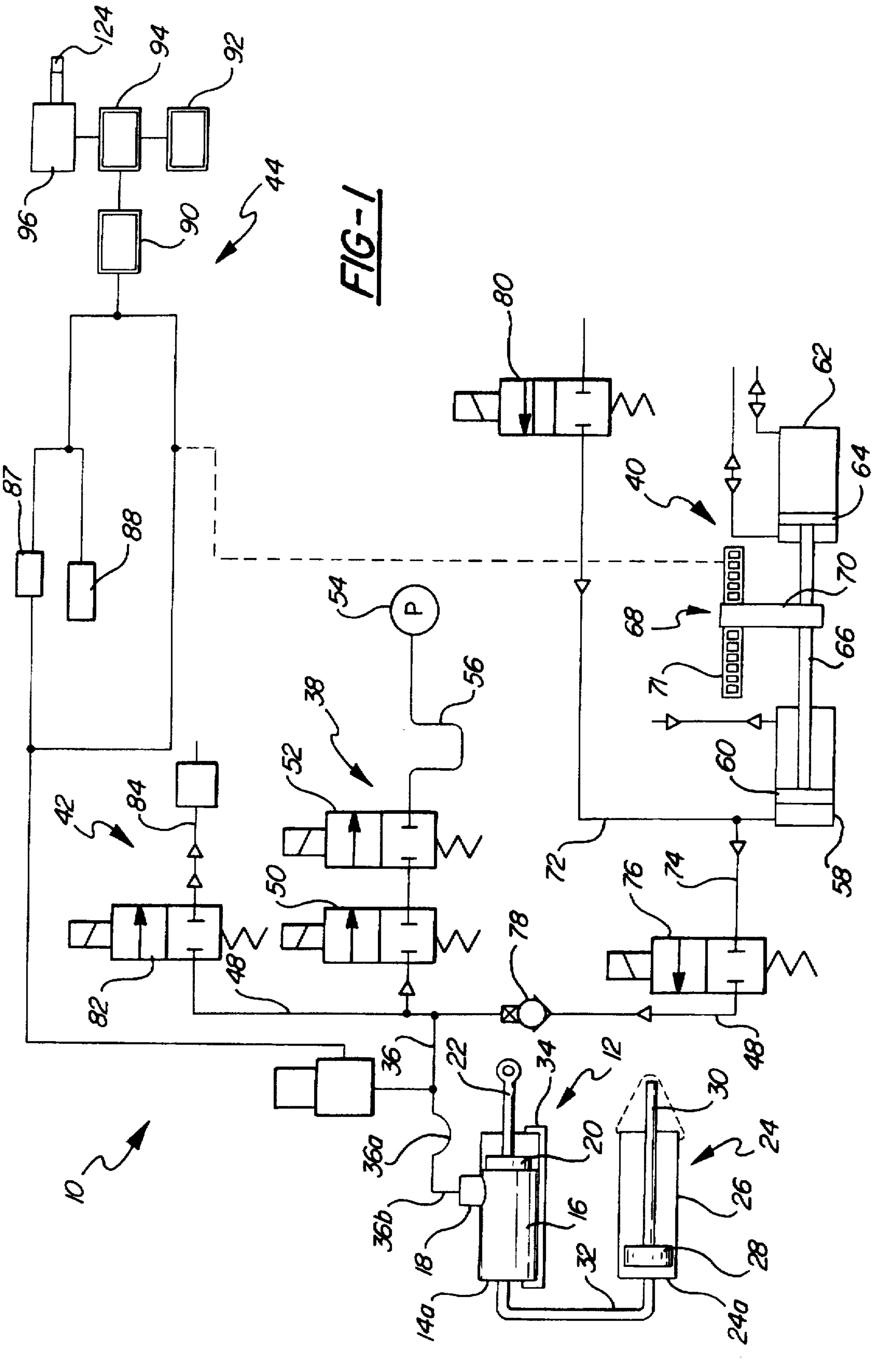
FIG. 1 is a schematic view of the invention test apparatus.
Figure 2:
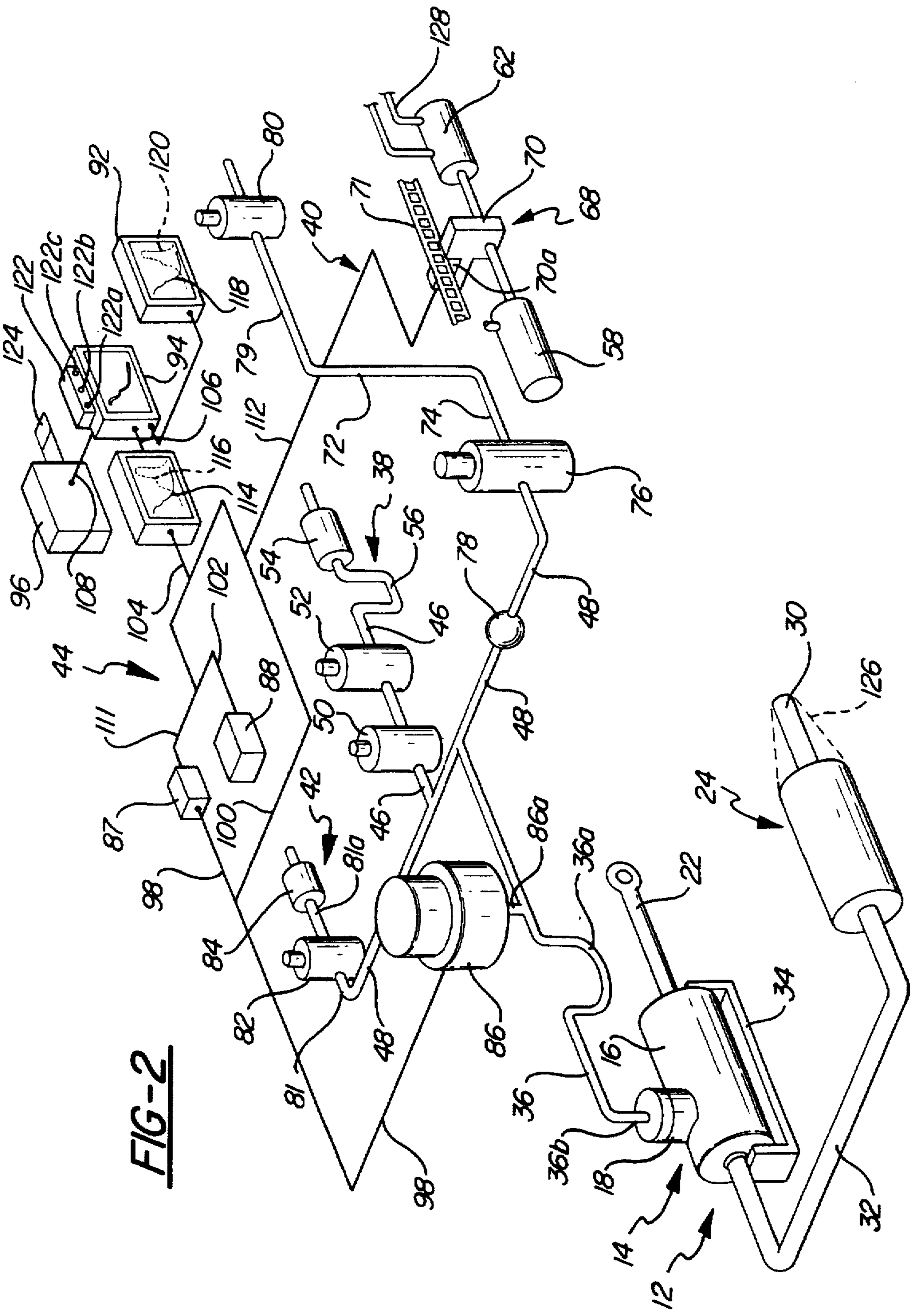
FIG. 2 is a perspective somewhat diagrammatic view of the invention test apparatus.

The invention test apparatus 10 is intended for use in filling, and testing the integrity of, a fluid pressure apparatus having a fluid pressure chamber. For example, test apparatus 10 may be utilized to fill and test hydraulic control apparatus or assembly 12.

Hydraulic apparatus 12 includes a master cylinder 14 including a housing 16, a reservoir 18, a piston 20, and a push rod 22; a slave cylinder 24 including a housing 26, a piston 28, and a push rod 30; and a conduit 32 interconnecting the discharge end 14*a* of the master cylinder with the intake end 24*a* of the slave cylinder. Apparatus 12 may comprise, for example, a clutch control apparatus for a motor vehicle in which the apparatus is supplied to a motor vehicle manufactured in prefilled and pretested form so that the clutch control apparatus is ready for use simply by connecting the push rod 22 to the clutch pedal of the motor vehicle and associating the push rod 30 with a control lever for the clutch throw out bearing.

Test apparatus 10 includes a fixture 34, an evacuate/fill conduit 36 including a trap 36*a*; an evacuation system 38, a fill system 40, a scavenge system 42, and an evaluation system 44.

Fixture 34 is configured to hold the housing 16 of master cylinder 14 so as to preclude movement of the master cylinder during the test procedure.

Evacuate/fill conduit 36 includes a free or distal end 36*b* communicating with reservoir 18 and another end 36*c*.

Evacuation system 38 includes a conduit 46, a conduit 48 connecting with conduit 46 and with the other end 36*c* of conduit 36, a pair of solenoid valves 50 and 52 interposed serially in conduit 46, a vacuum pump 54 communicating with the distal end of conduit 46, and a trap 56 interposed between solenoid valve 52 and vacuum pump 54.

Fill system 40 includes an oil cylinder 58 including a piston 60, an air cylinder 62 including a piston 64, a connecting rod 66 connecting pistons 60 and 64, a linear incremental optical encoder 68 including a sensor 70 mounted on connecting rod 66 and a fixed optical bar 71 positioned in a gap 70*a* of the sensor, a conduit 72 communicating with one end of the oil cylinder, a conduit 74 extending between conduit 72 and one end of conduit 48, a solenoid valve 76 in conduit 74, a check valve 78 in conduit 48, a conduit 79 connecting with the upper end of conduit 72, and a solenoid valve 80 interposed in conduit 79.

Scavenge system 42 includes a conduit 81 connected to the other end of conduit 48, a solenoid valve 82 interposed in conduit 81, and a scavenge pump 84 connected to the distal or free end 81*a* of conduit 81.

Evaluation system 44 includes a transducer 86, an A/D converter 87, a clock 88, a signature generator 90, a computer 92, a comparator 94, a printer 96, and leads 98, 100, 102, 104, 106, 108, 110 and 112.

Transducer 86 may take any of several well known forms and, for example, may comprise a unit available from DCT Instruments of Columbus, Ohio, as Part No. PTG15VB. Transducer 86 includes a probe 86*a* communicating with test/fill conduit 36 and operative to sense the pressure in the conduit 36 at all times. Transducer 86 functions in known manner to convert the pressure signal sensed by the probe 86*a* to an output analog electrical signal on lead 98 having a magnitude proportioned to the magnitude of the sensed pressure signal.

A/D convertor 87 receives the analog signal on lead 98 and converts the analog signal in known manner to a corresponding digital signal for further transmission on lead 111.

Clock 88 is of known form and functions to emit a clocking or time pulsed signal at selected periodic intervals.

Signature generator 90 functions to generate a first signature 114 comprising an evacuation or vacuum signature and a second signature 116 comprising a pressure or fill signature 116.

Comparator 94 functions to store signatures corresponding to known satisfactory apparatus 12 and, specifically, stores a first vacuum signature 118 corresponding generally to signature 114 and a second fill signature 120 corresponding generally to fill signature 116. Signatures 118 and 120 are stored in computer 92 by testing a plurality of known satisfactory apparatus 12 to generate satisfactory evacuate and fill signatures.

Comparator 94 receives signatures 114/116 from generator 90 on lead 106 and signatures 118/120 from computer 92 on lead 110, compares the respective signatures and make decisions with respect to the acceptability or unacceptability of the apparatus under test based on the extent to which the signatures generated by generator 90 correspond to the stored signatures in computer 92. A light console 122 on comparator 94 includes a yellow light 122*a* indicating that a test is in progress, a green light 122*b* indicating that the unit under test is satisfactory, and a red light 122*c* indicating that the unit under test is unsatisfactory.

Printer 96 communicates with comparator 94 via lead 108 and functions, upon a signal from comparator 94, to print a detachable label 124 for securement to the defective apparatus. Specifically, when the comparator 94 determines that an apparatus under test is unsatisfactory it generates a signal via lead 108 for transmission to printer 96 whereupon the printer functions to print out a label 124 for securement to the failed apparatus. The information generated by comparator 94 with respect to each failed unit includes not only the fact that the unit has failed but also the specific nature of the defect causing the failure. Label 124 generated by printer 96 embodies a number or letter code identifying the specific defect of the apparatus.

OPERATION

In the operation of the invention test apparatus, control apparatus or assembly 12 is received at the test apparatus 10 following assembly of the control assembly 12 in known manner on a production line basis. As each control assembly 12 is received at the test station, the master cylinder 14 of the assembly is fixedly secured in the fixture 34, the distal end 36*b* of evacuate/fill conduit 36 is inserted into the reservoir of the master cylinder, and the push rod 30 of the slave cylinder is held in a contracted position by the utilization of, for example, a shipping strap 126.

With valves 76 and 82 closed and valves 50 and 52 open, vacuum pump 54 is actuated so as to begin to suck air out of the apparatus 12 via conduits 46, 48 and 36. As the air is sucked out of the pressure chambers of the apparatus 12 the pressure in the conduit drops gradually and this pressure is constantly sensed by transducer 86 so that transducer 86 generates a continuous but gradually dropping analog electrical signal on lead 98 for transmittal to A/D convertor 87 where the analog signal on line 98 is converted to a corresponding digital signal whereafter the digital signal is mixed with a clock signal on line 102 and the combined signal is fed to generator 90 to generate vacuum signature 114, best seen in FIG. 3.

In overview, signature 114 comprises a plot of pressure versus time, begins at approximately atmospheric or 14.7 psi, and gradually drops as air is exhausted from the pressure chambers of the apparatus 12, reaching a final value of approximately 0.002 psi after a time lapse of for example 12 seconds.

Critical and telltale points on the signature curve include the shape of the entry knee 114a, the location of the outgassing blip 114b (indicating the release of volatiles or air trapped in pores of the cylinders under test), the slope of the signature line in the region 114c, and the specific location of the diffusion point 114d (the point at which there is no longer enough pressure in the system to push air out). The vacuum signature is transmitted in progress by lead 106 to comparator 94 and the comparable portion of the stored vacuum signal 118 in the computer 92 is gradually and simultaneously transmitted via lead 110 to the comparator 94 so that the instantaneous and progressively developing signature from the assembly under test and the stored signature of a proper assembly are gradually and simultaneously displayed and compared.

Figure 3:
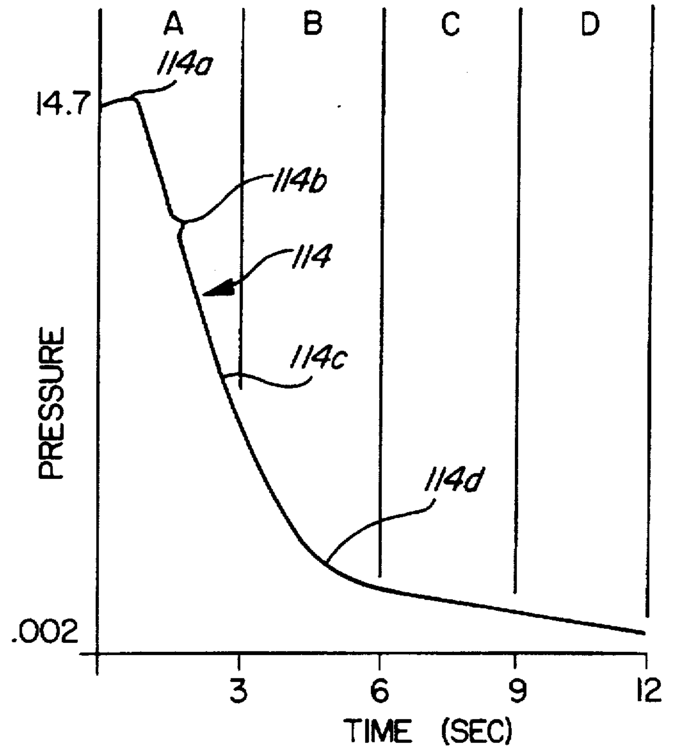
FIGS. 3 and 4 are vacuum and pressure signatures, respectively, generated by the invention test apparatus.

Although a decision with respect to the acceptability or unacceptability of the assembly under test may be deferred until the full signature has been developed and compared to the full stored signature, it is preferable, in the interest of saving time and money, to compare the two signatures at a plurality of points marking the respective conclusion of local graph sections such, for example, as the graph sections A, B, C and D seen in FIG. 3.

Thus the instantaneously generated signature and the stored signature may be compared at the end of graph section A after approximately three seconds of test. If the comparison reveals a discrepancy indicative of a defect, the test is immediately aborted and the test assembly is rejected. The operator is apprised of the rejection by illumination of the red light 122c on the light console 122 and the operator is precluded from releasing the master cylinder 14 from the test fixture 34 until he has performed an act, such as pressing a button or moving a lever, to indicate that he has noticed the red light and has therefore noticed that the unit under test is defective. At the same time that the defect is noted by the comparison taking place in the comparator 94, a signal is transmitted from the comparator to the printer, indicating that a defect has been noted and indicating the precise nature of the defect, and the printer 96 thereupon prints a label 124 indicating by letter or by number the nature of the defect, which label may be detached by the operator and positioned on the defective assembly to facilitate repair of the assembly for subsequent retesting.

If the comparison of sections A of the instantaneous and stored signatures does not reveal a defect, the test is continued and proceeds through section B. At the conclusion of section B, an instantaneous and stored signature are again compared, and a decision is again made with the acceptability or unacceptability of the assembly. This section by section comparison procedure continues until the test has proceeded through all four sections whereupon, assuming that the test assembly has passed at each comparison at the end of each section, the green light 122B is illuminated to apprise the operator that the assembly has passed the vacuum test. At such time as the test assembly is determined to have a defect, the exact nature of the defect may then be ascertained utilizing a lookup table incorporated in the comparator and/or the computer.

Defects that may be identified utilizing signature section A include gross part leaks and blocked or skived tubes or connectors. Defects that may be identified utilizing signature section B include reversed seals in the master cylinder, damaged seals in the master cylinder, missing or wrong components in the master cylinder, defective or damaged pistons in the master cylinder, center feed problems, blocked or skived tubes, fine leaks in the master cylinder, or scratched bores in the master or slave cylinder. Defects that may be identified utilizing signature section C include fine leaks in the slave cylinder and damaged connector seals. Defects that may be identified utilizing signature section D include unknown abnormalities or anomalies and out of tolerance parts.

Once the vacuum test has been completed, and assuming that the test has not been aborted by the detection of a defect in the assembly under test, valves 50 and 52 are closed, valve 76 is opened, and air under pressure is delivered to air cylinder 62 via conduit 128 to move the piston 64 forwardly and thereby move the piston 60 of the oil cylinder forwardly to eject hydraulic fluid out of the oil cylinder. The oil leaving the oil cylinder flows through conduit 72, conduit 74, valve 76, conduit 48, and check valve 78 to conduit 36 and thereafter into the reservoir 18 to begin filling the pressure chambers of the assembly under test.

Figure 4:
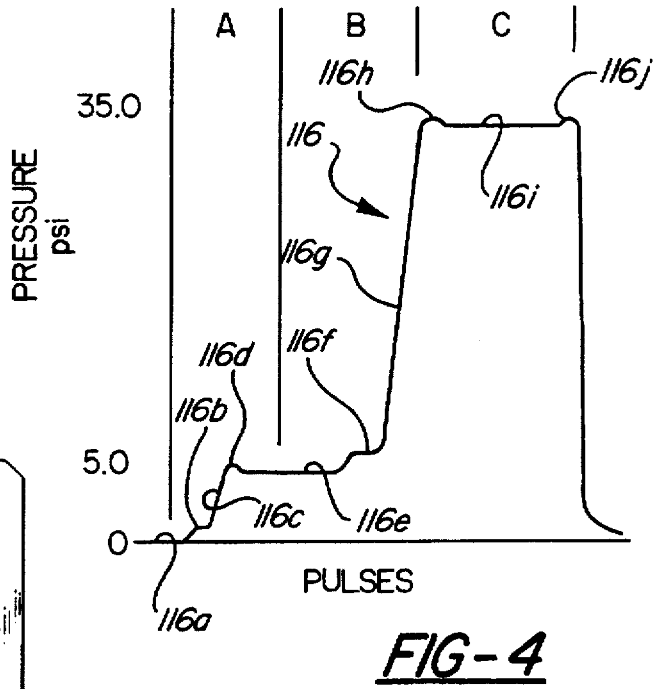
Figure 5:
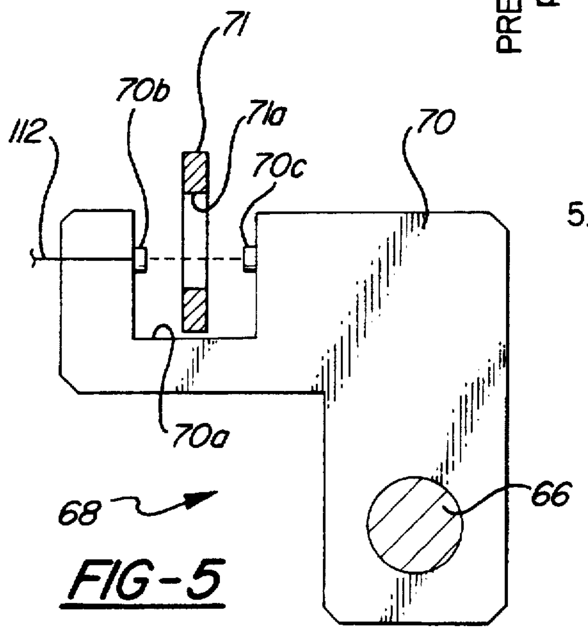
FIG. 5 is a detail view of an encoder utilized in the invention test apparatus.

As the hydraulic fluid flows through conduit 36 into the unit under test, transducer 86 continues to sense the pressure in the conduit 36 and continues to generate an analog signal on lead 98 for transmittal to A/D convertor 87 and transmittal via lead 111 and 104 to generator 90. This signal is mixed with a digital signal on lead 112 from encoder 68 generated by movement of the sensor 70 with connecting rod 66 relative to fixed optical bar 71 as pistons 60 and 54 continue to move forwardly. Specifically, optical bar 71 includes a plurality of equally, linearly spaced slits 71a; sensor 70 includes a diode 70b and a light detector 70c positioned on opposite sides of gap 70a; and the digital signal on lead 112 from encoder 68 is generated every time a beam is completed across the gap 70a between diode 70b and detector 70c by virtue of alignment of the diode and detector with a slit 71a. The fill signature developed during the fill cycle is seen in FIG. 4 and comprises a plot of pressure versus pulses of the encoder, which are indicative of the position of piston 60 of fill cylinder 58.

With respect to the fill signature, the analog signal generated by transducer 86 is read periodically in response to triggering from the encoder 68. Specifically, encoder 68 triggers A/D converter 87 to take a reading from transducer 86 every time the encoder ends a unit of movement as sensed by the alignment of the diode/detector 70b, 70c of the sensor with a slit 71a in the optical bar. The plot seen in FIG. 4 therefore includes a plurality of points generated at the end of each unit of linear movement of the connecting rod 66 as determined by the movement of sensor 70 with respect to bar 71. The pressure sensed by the transducer 86 during the course of the fill cycle ranges from essentially zero pressure during the initial portion of the cycle to approximately 35 psi at the maximum pressure in the cycle.

Notable and significant points on the fill signature 116 include a flat introductory portion 116a indicating the filling of the conduits leading to the assembly under test; a blip 116b indicating filling of the reservoir of the master cylinder; a steep slope portion 116c indicating movement of the oil through the orifice extending between the reservoir and the bore of the master cylinder; a blip 116d indicating the start of the filling of the master cylinder; a dwell portion 116e indicating continued filling of the master cylinder; a blip 116f indicating the beginning of the filling of the conduit 32; a steep slope portion 116g indicating the continued filling of the conduit; a blip 116h indicating the start of the filling of the slave cylinder; a plateau portion 116i indicating continued filling of the slave cylinder; and a blip 116j indicating the end of the fill cycle, whereafter the pressure falls off sharply and returns essentially to atmospheric.

As with the vacuum signature, comparison of the stored fill signature 120 to the instantaneously generated fill signature 116 may be delayed until the fill cycle has been completed but, preferably, comparisons are made at the end of each of a plurality of signature sections A, B and C and the test is aborted at such time as any one of these comparisons indicates a defect.

At such time as the comparator identifies a defect, either at the conclusion of any one of the sections A, B, or C or at the conclusion of the entire fill cycle, the comparator sends a signal to the printer 96 (to print a label 124 bearing a letter or number identifying the nature of the defect for attachment to the defective assembly under test) and causes the illumination of red light 122C (to apprise the operator that the assembly under test has failed and require the operator to perform a predetermined manual acknowledging operation prior to release of the assembly under test by fixture 34).

Defects that may be identified utilizing fill signature section A include system integrity, improper reservoir, improper supply hose, reversed or damaged master cylinder seals, center feed problems, missing or improper master cylinder components, and blocked or skived tubes or master cylinder end connectors.

Defects that may be identified utilizing fill signature Section B include improper conduit between master cylinder and slave cylinder, blocked or skived conduits or slave cylinder end connector, and improper connectors.

Defects that may be identified utilizing fill signature section C include improper slave cylinder, reverse seal in the slave cylinder, damaged or defective seal in the slave cylinder, damaged or defective piston in the slave cylinder, and missing or improper components.

Once the fill cycle has been completed, valve 76 is closed, valves 80 and 82 are opened, scavenge pump 84 is actuated, and the pressurized air supply to air cylinder 62 via conduits 128 is reversed. Reversing of the pressurized air supply to air cylinder 62 causes piston 60 to retreat in air cylinder 58; opening of valve 80 allows make-up oil to flow through conduit 79 and 72 to fill in the oil cylinder behind the retreating piston; and the actuation of the scavenge pump in conjunction with the opening of valve 82 allows the scavenge pump to suck residual oil in the system out of the system in preparation for the next test cycle.

If a defect is noted at the end of any of the sections A, B, C or D of the vacuum signature or at the end of any of the sections A, B or C of the fill signature, the test is immediately terminated. The operator is apprised of the failure by virtue of illumination of the red light 122c, and the operator, after acknowledging recognition of the failure by a suitable manual act, releases the master cylinder from the fixture 34 and places the failed apparatus 12 on a conveyor line leading to a rebuild station.

At the rebuild station the operator notes the label on the failed unit and specifically notes the specific letter or number code on the label indicating the specific defect in the unit, whereby to aid the repair person in the repair procedure. Following repair of the unit, the unit is placed again on the main conveyor line leading to the test/fill station where the unit is again tested and filled, and hopefully, passed on for shipment.

In overview, it is intended that the initial vacuum test detect the vast majority of the defective units while the units are still in a dry and therefore reusable condition, and that the subsequent pressure test detect those few defective units that were not detected by the vacuum test so that only a small percentage of the defective units that are ultimately detected comprise wet units that must be discarded.

The invention method and apparatus will be seen to provide many important advantages. Specifically, as compared to other systems employed by the assignee of the present invention for testing and filling, the test is quicker and, in fact, reduces the total evacuate and fill time by approximately 50%; the apparatus required to perform the testing is smaller and therefore takes up less space on the floor of the manufacturing and testing facilities; the test is more accurate since it involves a double test wherein the vast majority of the defective units are detected in the vacuum test and the remaining defective units are detected in the following fill test; since the vast majority of the defective units are detected in the vacuum test before they have been filled, only a few of the defective units are detected after filling and therefore only a few of the defective units have to be discarded; the system can be used to find and eliminate problems in the overall procedure rather than to simply detect bad units and as such provides a means of refining and improving the assembly process rather than simply a means of eliminating bad units resulting from the assembly process; and the fixturing required to hold the units under test is greatly improved and specifically is smaller, simpler, lends itself to modular fixturing, and provides easier loading of the units into the fixtures.

Although a preferred embodiment of the invention has been illustrated and described in detail it will apparent that various changes may be made in the disclosed embodiment without departing from the scope or spirit of the invention. For example, although the invention has been illustrated and described for purposes of clarity utilizing an item of comparator hardware to perform the comparison between the instantaneous signatures and the stored signatures, it will be understood that in actual practice the comparison between the instantaneous signatures and the stored signatures may be accomplished in known manner utilizing software.

Further, although the invention has been described with respect to the testing of a hydraulic unit including a master cylinder, a slave cylinder, and an interconnecting conduit, the system is equally applicable to the testing of master cylinder units per se with or without a quick connect coupling as well as slave cylinder units per se with or without a quick connect coupling.

Further, although the invention has been herein described with respect to a test facility at the end of the production line for the hydraulic unit to be tested and filled, the method of the invention may also be applied to systems (such as clutch or brake systems) that have already been incorporated into a motor vehicle in a dry condition as part of the overall motor vehicle assembly process in which case the invention method is used to test and fill the dry units in situ on the vehicle.

In broad overview, the present invention is applicable to the testing and filling of any fluid pressure apparatus having a fluid pressure chamber.

I claim:

1. A method of testing the integrity of a fluid pressure assembly having a fluid pressure chamber containing a mass of fluid having a pressure, the method comprising:

gradually varying the mass of fluid in the chamber;

noting the pressure of the fluid in the chamber at successive times as the mass is varied, whereby to generate successive pressure readings;

creating a test signature from the pressure readings;

testing a plurality of known satisfactory fluid pressure assemblies to generate a satisfactory assembly signature;

storing the satisfactory assembly signature; and comparing the test signature to the stored signature of a satisfactory assembly, whereby to determine the integrity of the assembly and the test.

2. A method according to claim 1 wherein:

the step of gradually varying the mass of fluid in the chamber comprises evacuating air from the chamber to gradually reduce the pressure in the chamber.

3. A method according to claim 1 wherein:

the step of gradually varying the mass of fluid in the chamber comprises gradually filling the chamber with a fluid.

4. A method according to claim 1 wherein:

the step of gradually varying the mass of fluid in the chamber comprises evacuating air from the chamber to gradually reduce the pressure in the chamber and thereafter gradually filling the chamber with a fluid;

the step of noting the pressure in the chamber at successive times comprises noting the pressure in the chamber at successive times as the chamber is evacuated and thereafter noting the pressure in the chamber at successive times as the chamber is filled;

the step of creating a test signature from the pressure readings comprises creating a vacuum signature as the chamber is evacuated and creating a fill signature as the chamber is thereafter filled; and the step of comparing the signature to a known stored signature comprises comparing the vacuum signature to a known stored vacuum signature and thereafter comparing the fill signature to a known stored fill test signature.

5. A method of testing the integrity of a fluid pressure assembly having a fluid pressure chamber, the method comprising:

subjecting the assembly to a vacuum cycle during which air is evacuated from the chamber to gradually reduce the air pressure in the chamber;

noting the air pressure in the chamber at successive times in the vacuum cycle as the pressure drops whereby to generate successive pressure readings corresponding to successive times in the vacuum cycle;

plotting the successive pressure readings against the successive times to create a signature from the pressure readings; and comparing the signature to a known, stored signature of a satisfactory assembly whereby to determine the integrity of the assembly under test.

6. A method according to claim 5 wherein the apparatus comprises a hydraulic apparatus including a hydraulic cylinder.

7. A method according to claim 6 wherein the hydraulic cylinder comprises a master cylinder and the apparatus further includes a slave cylinder and a conduit interconnecting the master cylinder and the slave cylinder.

8. A method according to claim 7 wherein the apparatus comprises a hydraulic clutch control system for a motor vehicle, the master cylinder includes a push rod for operative association with a clutch pedal of the motor vehicle, and the slave cylinder includes a push rod for operative association with a release lever for the release bearing of the clutch of the motor vehicle.

9. A method according to claim 1 wherein the apparatus comprises a hydraulic clutch control system for a motor vehicle.

10. A method of filling, and testing the integrity of, a fluid pressure assembly having a fluid pressure chamber, the method comprising:

subjecting the assembly to a fill cycle during which liquid is supplied to the chamber to gradually fill the chamber;

noting pressure in the chamber at successive times in the fill cycle during the filling whereby to generate successive pressure readings corresponding to successive times in the fill cycle;

plotting the successive pressure readings versus the successive times to create a signature from the pressure readings; and comparing the signature to a known stored signature of a satisfactory assembly, whereby to determine the integrity of the assembly under test.

11. A method according to claim 10 wherein the assembly comprises a hydraulic assembly including a hydraulic cylinder.

12. A method according to claim 11 wherein the hydraulic cylinder comprises a master cylinder and the assembly further includes a slave cylinder and a conduit interconnecting the master cylinder and the slave cylinder.

13. A method according to claim 12 wherein the assembly comprises a hydraulic clutch control system for a motor vehicle, the master cylinder includes a push rod for operative association with a clutch pedal of the motor vehicle, and the slave cylinder includes a push rod for operative association with a release bearing of the clutch of the motor vehicle.

14. A method according to claim 10 wherein the assembly comprises a hydraulic clutch control system for a motor vehicle.

15. A method of testing the integrity of a fluid pressure assembly having a fluid pressure chamber, the method comprising:

evacuating air from the chamber during a vacuum cycle to gradually reduce pressure in the chamber;

noting the pressure in the chamber at successive times during the vacuum cycle as the pressure drops, whereby to generate a first set of successive pressure readings corresponding to successive times in the vacuum cycles;

plotting the first set of successive pressure readings versus time to create a vacuum signature from the first set of pressure readings having a series of successive points corresponding to successive times in the vacuum cycle;

comparing the successive points of the vacuum signature to corresponding successive points of a known, stored vacuum signature of a satisfactory assembly, whereby to evaluate the integrity of the assembly under test;

filling the evacuated chamber with a fluid during a fill cycle;

noting the pressure in the chamber at successive times during the fill cycle as the chamber is filled, whereby to generate a second set of successive pressure readings corresponding to successive times in the fill cycle;

plotting the second set of successive pressure readings versus time to create a fill signature from the second set of pressure readings having a series of successive points corresponding to successive times in the fill cycle; and comparing the successive points of the fill signature to corresponding successive points of a known stored fill signature at a satisfactory assembly, whereby to further evaluate the integrity of the assembly under test.

16. A method according to claim 15 wherein the assembly comprises a hydraulic assembly including a hydraulic cylinder.

17. A method according to claim 16 wherein the hydraulic cylinder comprises a master cylinder and the assembly further includes a slave cylinder and a conduit interconnecting the master cylinder and the slave cylinder.

18. A method according to claim 17 wherein the assembly comprises a hydraulic clutch control system for a motor vehicle, the master cylinder includes a push rod for operative association with a clutch pedal of the motor vehicle, and the slave cylinder includes a push rod for operative association with a release bearing of the clutch of the motor vehicle.

19. A method according to claim 15 wherein the assembly comprises a hydraulic clutch control system for a motor vehicle.

20. A method according to claim 9 wherein the clutch control system includes a slave cylinder for operative association with a release bearing of the clutch of the motor vehicle.

21. A method according to claim 14 wherein the clutch control system includes a slave cylinder for operative association with a release bearing of the clutch.

22. A method according to claim 19 wherein the clutch control system includes a slave cylinder for operative association with a release bearing of the clutch.

23. An apparatus for filling and testing the integrity of, a fluid pressure assembly having a fluid pressure chamber, the apparatus comprising:

a conduit having a free end for connection to a port communicating with the pressure chamber of the fluid pressure assembly and a second end;

a source of vacuum;

a source of pressurized fluid;

switch means operative to selectively connect the vacuum source to the second end of the conduit while blocking communication between the fluid source and the second end of the conduit, whereby to evacuate the pressure chamber, or connect the fluid source to the second end of the conduit while blocking communication between the vacuum source and second end of the conduit, whereby to fill the pressure chamber with fluid;

a transducer operative to sense the pressure in the conduit and generate an output signal proportioned to the pressure;

means operative in response to receipt of the output signal of the transducer to generate a signature representative of the pressure variations in the conduit;

means storing a signature corresponding to an acceptable assembly; and means for comparing the stored signature to the generated signature.

24. An apparatus according to claim 23 wherein:

the transducer is operative during evacuation of the pressure chamber to produce a set of evacuation pressure readings and operative during the filling of the pressure chamber to produce a set of fill pressure readings;

the generating means is operative to generate an evacuation signature in response to receipt of the set of evacuation pressure readings and operative to generate a fill signature in response to receipt of the set of fill pressure readings;

the storage means stores an acceptable evacuation signature and an acceptable fill signature; and the comparing means is operative to compare the generated evacuation signature to the stored evacuation signature and compare the generated fill signature to the stored fill signature.

25. An apparatus according to claim 23 wherein:

the apparatus further includes a printer;

the analyzing means is operative in response to a mismatch between the generated signature and the stored signature, indicative of a specific defect in the assembly, to generate a reject signal coded to the specific defect for transmission to the printer; and the printer is operative in response to receipt of the coded reject signal to print a label coded to the specific identified defect.

26. An apparatus for filling, and testing the integrity of, a fluid pressure assembly having a fluid pressure chamber, the apparatus comprising:

a conduit having a free end for connection to a port communicating with the pressure chamber of the fluid pressure assembly and a second end;

a source of vacuum;

a source of pressurized fluid;

switch means operative to selectively connect the vacuum source to the second end of the conduit while blocking communication between the fluid source and the second end of the conduit, whereby to evacuate the pressure chamber, or connect the fluid source to the second end of the conduit while blocking communication between the vacuum source and second end of the conduit, whereby to fill the pressure chamber with fluid; and a transducer operative to sense the pressure in the conduit and generate an output signal proportioned to the pressure;

the fluid source comprising a fill cylinder and means operative to eject fluid from the fill cylinder for transport through the conduit to fill the pressure chamber of the fluid pressure assembly;

the ejecting means including a rod movable linearly during ejection of the fluid from the fill cylinder; and the apparatus further includes an encoder sensing the linear movement of the rod and operative to trigger a reading of the transducer output signal at the conclusion of each predetermined increment of rod movement.

27. An apparatus according to claim 26 wherein the apparatus further includes:

means operative in response to receipt of the output signal of the transducer, as triggered by the encoder, to generate a fill signature representative of the pressure variations in the conduit during the filling of the pressure chamber.

28. An apparatus according to claim 27 wherein the apparatus further includes means operative to analyze the fill signature.

29. An apparatus according to claim 28 wherein:

the analyzing means comprises means storing a fill signature corresponding to an acceptable assembly and means for comparing the stored fill signature to the generated fill signature.

* * * * *